(12) United States Patent
Chen

(10) Patent No.: US 10,079,641 B1
(45) Date of Patent: Sep. 18, 2018

(54) SYSTEMS AND METHODS OF TRANSPORTING DATA OVER AN OPTICAL TRANSPORT NETWORK

(71) Applicant: Sprint Spectrum LP, Overland Park, KS (US)

(72) Inventor: Walter Chen, Reston, VA (US)

(73) Assignee: SPRINT SPECTRUM, L.P., Overland Park, KS (US)

(*) Notice: Subject to any disclaimer, the term of this patent is extended or adjusted under 35 U.S.C. 154(b) by 707 days.

(21) Appl. No.: 14/242,594

(22) Filed: Apr. 1, 2014

(51) Int. Cl.
*H04B 10/27* (2013.01)
*H04L 12/54* (2013.01)
*H04L 12/801* (2013.01)

(52) U.S. Cl.
CPC ............ *H04B 10/27* (2013.01); *H04L 12/56* (2013.01); *H04L 47/10* (2013.01)

(58) Field of Classification Search
CPC ........ H04J 3/1652; H04J 3/0691; H04J 3/085; H04J 3/1623; H04J 3/1611; H04J 14/02; H04J 14/00; H04B 10/27; H04L 12/56; H04L 47/10; H04L 47/20; H04L 47/215; H04L 47/29; H04L 47/31; H04L 47/32
See application file for complete search history.

(56) References Cited

U.S. PATENT DOCUMENTS

| | | | | |
|---|---|---|---|---|
| 7,266,296 B2* | 9/2007 | Ovadia | ............ | H04Q 11/0066 398/45 |
| 7,561,795 B2* | 7/2009 | Mascolo | ............ | H04J 3/14 370/216 |
| 2004/0252995 A1* | 12/2004 | Ovadia | ............ | H04Q 11/0066 398/54 |
| 2005/0286521 A1* | 12/2005 | Chiang | ............ | H04J 3/1652 370/389 |
| 2005/0288062 A1* | 12/2005 | Hammerschmidt | .. | H04L 1/0002 455/562.1 |
| 2007/0264015 A1* | 11/2007 | Li | ............ | H04J 3/1611 398/45 |
| 2009/0074410 A1* | 3/2009 | Zou | ............ | H04J 3/1652 398/52 |
| 2009/0185650 A1* | 7/2009 | Ravid | ............ | H04B 7/0617 375/376 |
| 2009/0219913 A1* | 9/2009 | Nakamura | ............ | H04B 7/2656 370/345 |

(Continued)

OTHER PUBLICATIONS

ITU-T, Interfaces for the Optical Transport Network (OTN), Dec. 2009, ITU-T, G.709/Y.1331, Series G and Series Y, entirely document.*

*Primary Examiner* — Phong La

(57) ABSTRACT

In systems and methods of transporting data over an optical transport network, a first client signal and a second client signal are received at a network element of the optical transport network, each of the first client signal and the second client signal comprising a header and a data payload. An optical data unit is assembled comprising the first client signal and the second client signal in sequence, and the optical data unit is transmitted over the optical transport network. The first data payload and the second data payload may not be interleaved, and further, the first header and the second header may not be interleaved. The optical data unit can comprise the first client signal and the second client signal in a time sequence.

14 Claims, 8 Drawing Sheets

(56) References Cited

U.S. PATENT DOCUMENTS

| | | | |
|---|---|---|---|
| 2010/0238936 A1* | 9/2010 | Matsui | H04L 49/1523 370/394 |
| 2011/0096666 A1* | 4/2011 | Davari | H04L 47/10 370/235 |
| 2011/0116793 A1* | 5/2011 | Zhang | H04J 3/1611 398/43 |
| 2011/0150468 A1* | 6/2011 | Uchida | H04J 3/1658 398/45 |
| 2011/0170866 A1 | 7/2011 | Loprieno et al. | |
| 2012/0002965 A1 | 1/2012 | Bellato et al. | |
| 2012/0014270 A1* | 1/2012 | Honma | H04J 3/07 370/252 |
| 2012/0039609 A1* | 2/2012 | Dong | H04J 3/1652 398/66 |
| 2012/0047419 A1* | 2/2012 | Shinya | H04L 1/0045 714/800 |
| 2012/0201535 A1* | 8/2012 | Loprieno | H04J 3/12 398/45 |
| 2012/0251106 A1* | 10/2012 | Valiveti | H04L 47/34 398/45 |
| 2012/0263475 A1* | 10/2012 | Su | H04J 3/1652 398/100 |
| 2013/0004169 A1 | 1/2013 | Mohamad et al. | |
| 2013/0039658 A1* | 2/2013 | Abbas | H04J 3/1652 398/52 |
| 2013/0106657 A1* | 5/2013 | Perthold | G01S 5/021 342/387 |
| 2013/0108268 A1* | 5/2013 | Valiveti | H04J 3/1652 398/58 |
| 2013/0108273 A1* | 5/2013 | Valiveti | H04J 3/1652 398/79 |
| 2013/0209087 A1* | 8/2013 | Yuan | H04J 3/1652 398/9 |
| 2013/0222021 A1* | 8/2013 | Sugiyama | H04J 3/0691 327/144 |
| 2013/0308691 A1* | 11/2013 | Sturkovich | H04L 27/34 375/222 |
| 2014/0093235 A1* | 4/2014 | Gareau | H04J 3/1652 398/25 |
| 2014/0226980 A1* | 8/2014 | Walker | H04J 14/00 398/43 |
| 2016/0127072 A1* | 5/2016 | Chen | H04J 3/1652 398/58 |
| 2016/0142179 A1* | 5/2016 | Fludger | H04B 10/25137 398/65 |

\* cited by examiner

US 10,079,641 B1

SYSTEMS AND METHODS OF TRANSPORTING DATA OVER AN OPTICAL TRANSPORT NETWORK

TECHNICAL BACKGROUND

Data transportation across a communication network is critical to network performance. The advent of fiber optics as a means of information transmission has enabled increasingly greater speed and volume of data transportation, and fiber optic data transport systems have evolved to form the backbone of most communications and telecommunications networks. Optical transport networks began as systems designed for optical interfaces that used a single wavelength per fiber. As optical component technology advanced, systems permitting the transmission of multiple optical signals over the same fiber using wavelength division multiplexing enabled an increase in data carriage capacity without increasing the signal rate per se.

OVERVIEW

In one embodiment, to transport data over an optical transport network, a first client signal and a second client signal are received at a network element of the optical transport network, each of the first client signal and the second client signal comprising a header and a data payload. An optical data unit is assembled comprising the first client signal and the second client signal in sequence, and the optical data unit is transmitted over the optical transport network. In an embodiment, the first data payload and the second data payload are not interleaved. Additionally, the first header and the second header may not be interleaved. In one example, the optical data unit comprises the first client signal and the second client signal in a time sequence.

DETAILED DESCRIPTION

Figure 1:
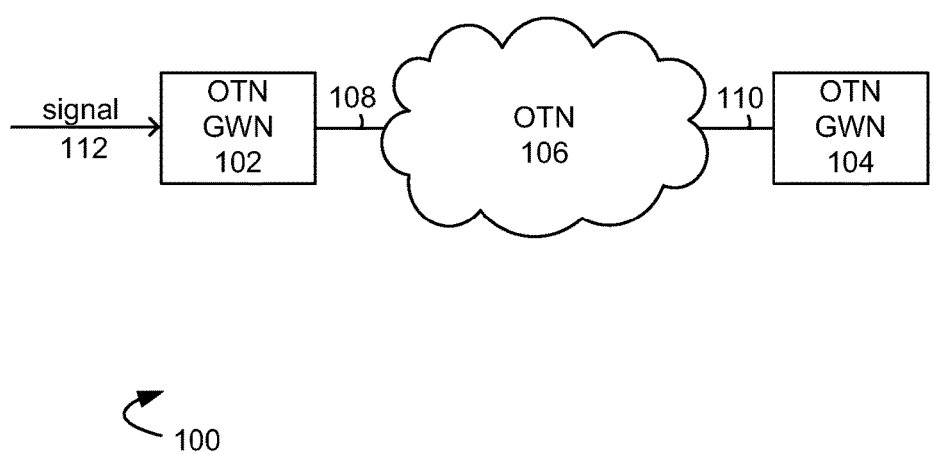
FIG. 1 illustrates an exemplary communication system for transporting data over an optical transport network.

FIG. 1 illustrates an exemplary communication system 100 to transport data over an optical transport network comprising optical transport network (OTN) gateway node 102, OTN gateway node 104, and optical transport network 106. OTN gateway nodes 102 and 104 are each a network element of an optical transport network. OTN gateway nodes 102 and 104 can comprise a processor and associated circuitry to execute or direct the execution of computer-readable instructions, and can be configured to transport data over OTN 106. OTN gateway nodes 102 and 104 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. OTN gateway nodes 102 and 104 can receive instructions and other input at a user interface.

OTN gateway nodes 102 and 104 can comprise a network element, such as an optical gateway node, an optical router node, an optical switch, or another optical network element, including a standalone computing device, a computer system, or another network component, capable of receiving a signal (such as signal 112) from one or more optical network clients and processing the signal for transport across optical transport network 106. OTN gateway node 102 comprises one or more interfaces to receive signal 112 from a network client (as well as communicate information to the network clients), and OTN gateway node 104 can comprise one or more interfaces to communicate with one or more other network clients. OTN gateway node 102 is in communication with OTN 106 over communication link 108, and OTN gateway node 104 is in communication with OTN 106 over communication link 110.

Optical transport network 106 can comprise wired and wireless communication components, including processing nodes, routers, gateways, and physical and/or wireless data links for carrying data among various network elements, including combinations thereof, and can further include network elements of a local area network, a wide area network, and an internetwork (including the Internet). Optical transport network 106 can be capable of carrying a wide range of data, including SDH/SONET, ATM, IP, Ethernet, Fibre Channel, and other client signals. OTN 106 can utilize one or more communication protocols to organize the transport of information, including ITU-T Recommendation G.709 and other similar protocols. Signals transported on OTN 106 can be multiplexed using one or more multiplexing schemes, such as dense wavelength division multiplexing (DWDM). Aspects of optical transport network 106 can further comprise a wireless network, including base stations, wireless communication nodes, telephony switches, internet routers, network gateways, computer systems, communication links, or some other type of communication equipment, including combinations thereof.

Communication links 108 and 110 typically comprise optical network pathways over fiber optic cable. Additional network elements may also be present to facilitate information transport over communication links 108 and 110, and aspects can comprise wired or wireless communication links, which may use additional appropriate communication protocols. Other network elements may be present in communication system 100 to facilitate wireless communication among OTN gateway node 102, OTN 106, and OTN gateway node 104 but are omitted for clarity, including additional processing nodes, routers, gateways, and physical and/or wireless data links for carrying data among the various network elements.

Figure 2:
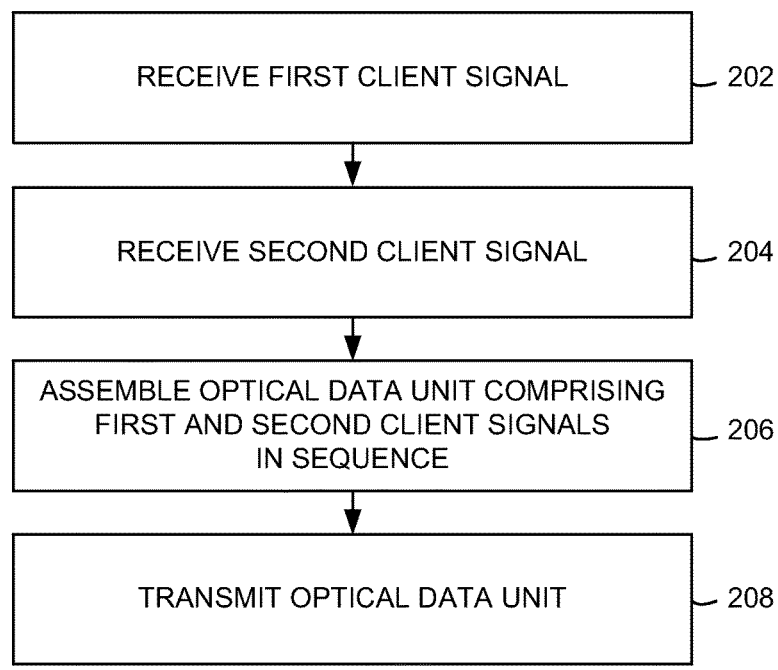
FIG. 2 illustrates an exemplary method of transporting data over an optical transport network.

FIG. 2 illustrates an exemplary method of transporting data over an optical transport network. A first client signal is received at a network element of the optical transport network (operation 202), and subsequently or together with the first client signal, a second client signal is received at the network element of the optical transport network (operation 204). The network element can comprise an OTN gateway node or similar network element, such as OTN gateway node 102. The first and second client signals can be received substantially simultaneously, such as when the communication network comprises a synchronized network. For example, signal 112 (FIG. 1) can represent the first client signal and the second client signal. This is merely exemplary, and a greater number of client signals may arrive as well. The first client signal comprises a first header and a first data payload, and the second client signal comprises a second header and a second data payload. The data portion or data payload portion of a packet remains distinct from a header portion, even where the packet receives additional header information (such as by packet encapsulation or a similar process). In other words, even when a packet is encapsulated, or even when additional header information is added to a data packet, any additional header information does not combine information from the data portion with any header portion, and the data portion and the header portion are considered distinct from each other.

Figure 3A:
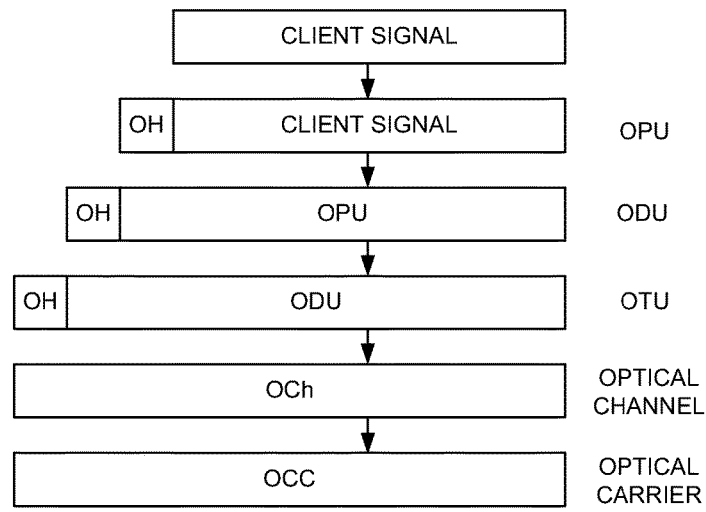
FIG. 3A illustrates an exemplary optical transport network frame structure.

FIG. 3A illustrates an exemplary optical transport network frame structure. A client signal, such as a SDH/SONET, ATM, IP, Ethernet, Fibre Channel, or other signal from an optical network client can be received, and a header (overhead OH) can be added to the signal comprising payload structure and payload type information, to form an optical payload unit (OPU). Next, a header can be added to the OPU, the header comprising, for example, information for maintenance and operational functions to support optical channels, such as tandem connection monitoring information and the like, to form an optical data unit (ODU). Further, a header can be added to the ODU, comprising, for example, bit timing content and frame alignment information, to form an optical transport unit (OTU). The OTU can further comprise forward error correction (FEC) information. The OTU can be carried on an optical channel (OCh) by one or more wavelengths of light. A plurality of wavelengths can be multiplexed into an optical carrier (OCC).

Figure 3B:
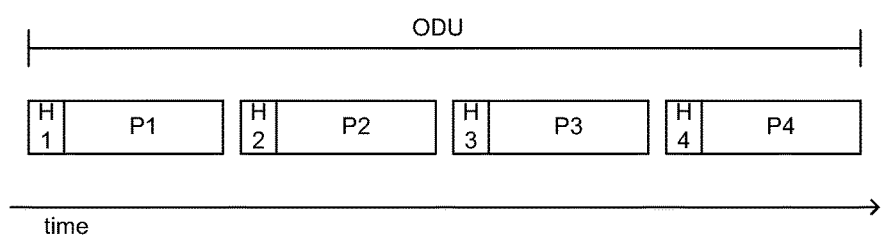
FIG. 3B illustrates an exemplary optical data unit.

Returning to FIG. 2, in operation 206, an optical data unit is assembled, the optical data unit comprising the first client signal and the second client signal in sequence. FIG. 3B illustrates an exemplary optical data unit (ODU). In assembling client signals and/or optical payload units (OPUs) into an ODU, methods using greater computational complexity increase processor load of optical network elements and add latency to signal transmission in the OTN. For example, ITU G.709 specifies a multi-frame byte-interleaved three step procedure to map optical signals into higher level optical frames.

Using a single ODU frame interval to transport signal data without interleaving the signal data or signal data header information substantially reduces complexity and increases the speed of transport over the OTN, and further reduces equipment costs otherwise required by more complex methods of ODU assembly. Accordingly, the ODU frame interval can be used as a unit in which to assemble data for transport in the ODU, for example, by time-division assembly of the data. An ODU frame size can be standardized, regardless of transmission speed (for example, data rates corresponding to ODU0 through ODU4, and beyond), so that data transmission rates and carriage capacity are proportional. For example, if an optical line rate is OTU3 (corresponding to approximately 40 Gbps)=4×OTU2 (10 Gbps), the OTU3 frame interval is approximately 3 microseconds, i.e., an OTU3 frame will be transmitted every 3.03 microseconds. Further, multiplexing four ODU4 signals into an OTU3 is approximately equivalent to transmitting four separate OTU2 signals, where each OTU2 channel signal is transmitted every four frames, resulting in a frame rate of approximately 12 microseconds, which is also approximately the frame rate for an OTU2 signal.

Referring to FIG. 3B, an ODU comprises a first client signal comprising a first header (H1) and a first data payload (P1), and a second client signal comprising a second header (H2) and a second data payload (P2). The ODU illustrated in FIG. 3B further comprises a third client signal comprising a third header (H3) and a third data payload (P3), and a fourth client signal comprising a fourth header (H4) and a fourth data payload (P4). The client signals are assembled into the ODU in sequence. That is, the second header H2 follows the first client payload P1, the third header H3 follows the second client payload P2, and so forth. In an embodiment, the client signals can be assembled into the ODU using a time sequence, such as time division multiplexing. As illustrated in FIG. 3B, the first data payload P1, the second data payload P2, the third data payload P3, and the fourth data payload P4 are not interleaved. Further, headers H1, H2, H3 and H4 are not interleaved. In an embodiment, the headers and the data payloads are not interleaved in an ODU.

Returning to FIG. 2, the assembled ODU is then transmitted over the optical transport network (operation 208). For example, the assembled ODU (FIG. 3B) can be transmitted from OTN gateway node 102 to OTN gateway node 104 over OTN 106. Thus, an ODU frame interval can be used as a unit in which to perform time-division assembly of data for transport in the ODU. Using a single ODU frame interval to transport signal data without interleaving the signal data or signal data header information, rather than more complex multi-frame data interleaving methods, substantially reduces complexity and increases the efficiency of data transport over the OTN. Further, equipment costs can be reduced for network elements of OTN systems that perform computationally complex multi-frame interleaving tasks on transmission and re-assembling tasks on reception of signals.

In an embodiment, the rate of transmission of the assembled ODU can be twice the rate of reception of the first and second client signals. That is, the data rate of the first and second client signals can be half of the data rate of the transmitted ODU. Further, the data rate of an outgoing signal can comprise a multiple of an inbound signal. For example, when a data rate of an ODU0 signal is 1.25 Gpbs, a data rate of an ODU1 signal can be 2.5 Gbps (i.e., ODU0×2), a data rate of an ODU2 signal can be 10 Gbps (i.e., ODU1×4), a data rate of an ODU3 signal can be 40 Gbps (i.e., ODU2×4), a data rate of an ODU4 signal can be 100 Gbps (i.e., ODU×2.5), and a data rate of an ODU5 signal can be 400 Gbps (i.e., ODU4×4).

Figure 4:
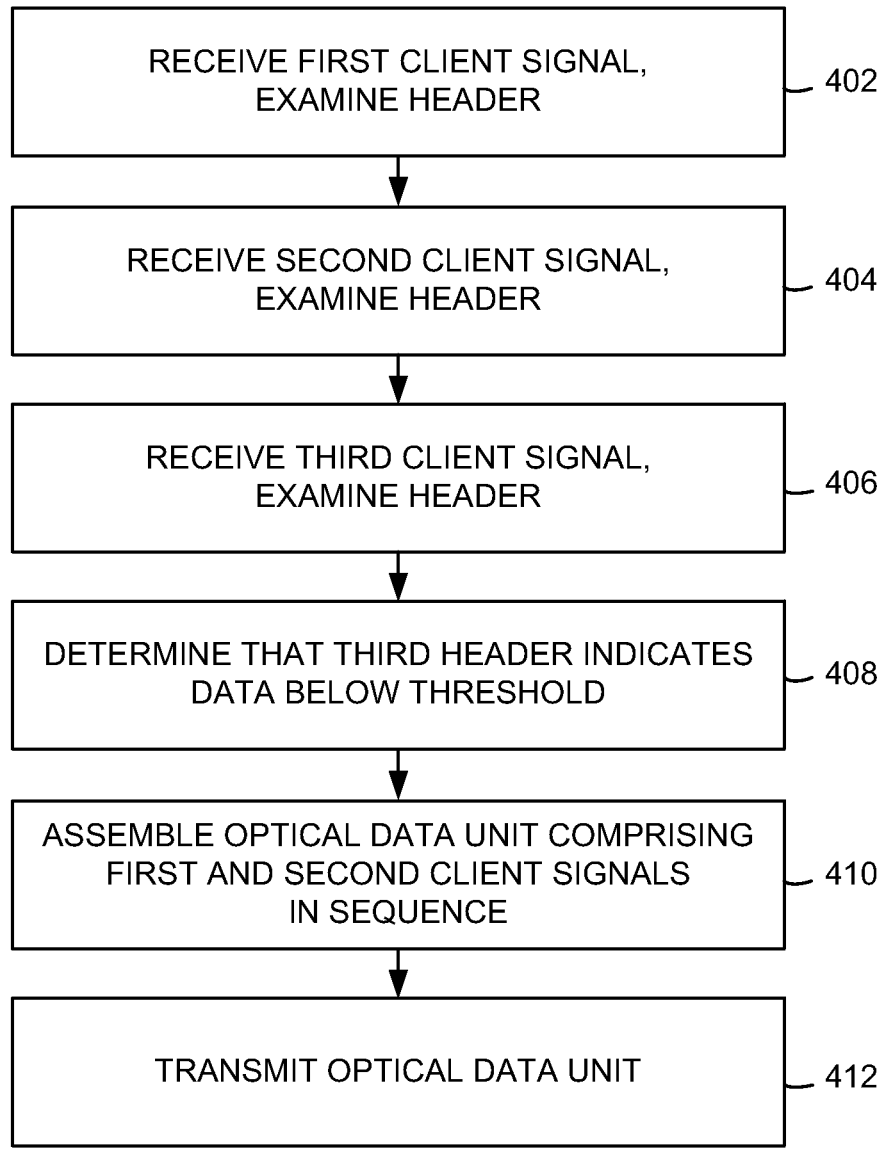
FIG. 4 illustrates another exemplary method of transporting data over an optical transport network.

FIG. 4 illustrates another exemplary method of transporting data over an optical transport network. A first client signal is received at a network element of the optical transport network and a header of the first client signal is examined (operation 202), and subsequently or together with the first client signal, a second client signal is received at the network element of the optical transport network and a second header of the second client signal is examined (operation 204). The client signal can comprise an OPU (FIG. 3A) comprising a client signal and a header. The header can comprise an indication of an amount of data in the client signal (i.e., the payload of the OPU). The network element can comprise an OTN gateway node or similar network element, such as OTN gateway node 102. The first client signal comprises a first header and a first data payload, and the second client signal comprises a second header and a second data payload. The data portion or data payload portion of a packet remains distinct from a header portion, even where the packet receives additional header information (such as by packet encapsulation or a similar process). Even when a packet is encapsulated, or even when additional header information is added to a data packet, any additional header information does not combine information from the data portion with any header portion.

In operation 406, a third client signal is received at the network element of the optical transport network and a header of the third client signal is examined. It can then be determined that the third header comprises an indication that an amount of data in the third payload comprises an amount of data below a threshold amount of data (operation 408). In a synchronized network, such as many optical transport networks, optical network elements (and their respective control planes) are typically not configured to examine whether a data frame comprises client data (e.g., the client signal illustrated at the top of FIG. 3A). Thus, optical network elements can transmit data frames whether or not the data payload comprises client data.

When an optical network element (e.g., OTN gateway node 102) is configured to examined a client signal header, the network element can determine whether the header comprises an indication that an amount of data in the payload meets a threshold amount of data. For example, to increase efficiency of utilization of OTN resources to transport information, header information of each client signal can be examined for an indication of an amount of data in each client signal payload. Where a client signal is substantially empty, or the amount of data in the client signal payload meets or is below a threshold amount of data, the client signal can be dropped by the network element (e.g., OTN gateway node 102) before transport over the optical transport network (e.g., OTN 106). This operation is enabled by the use of a single ODU frame interval to transport signal data without interleaving the signal data or signal data header information, rather than more complex multi-frame interleaving methods.

Subsequently, the optical data unit is assembled comprising the first client signal and the second client signal in sequence without the third client signal according to the third header indication (operation 410), and the assembled ODU is transmitted across the OTN (operation 412). Thus, to increase efficiency of resource utilization on the OTN, as well as processing efficiency of network elements such as OTN gateway nodes 102 and 104, substantially empty frames can be dropped or ignored and not transported across the OTN.

Figure 5:
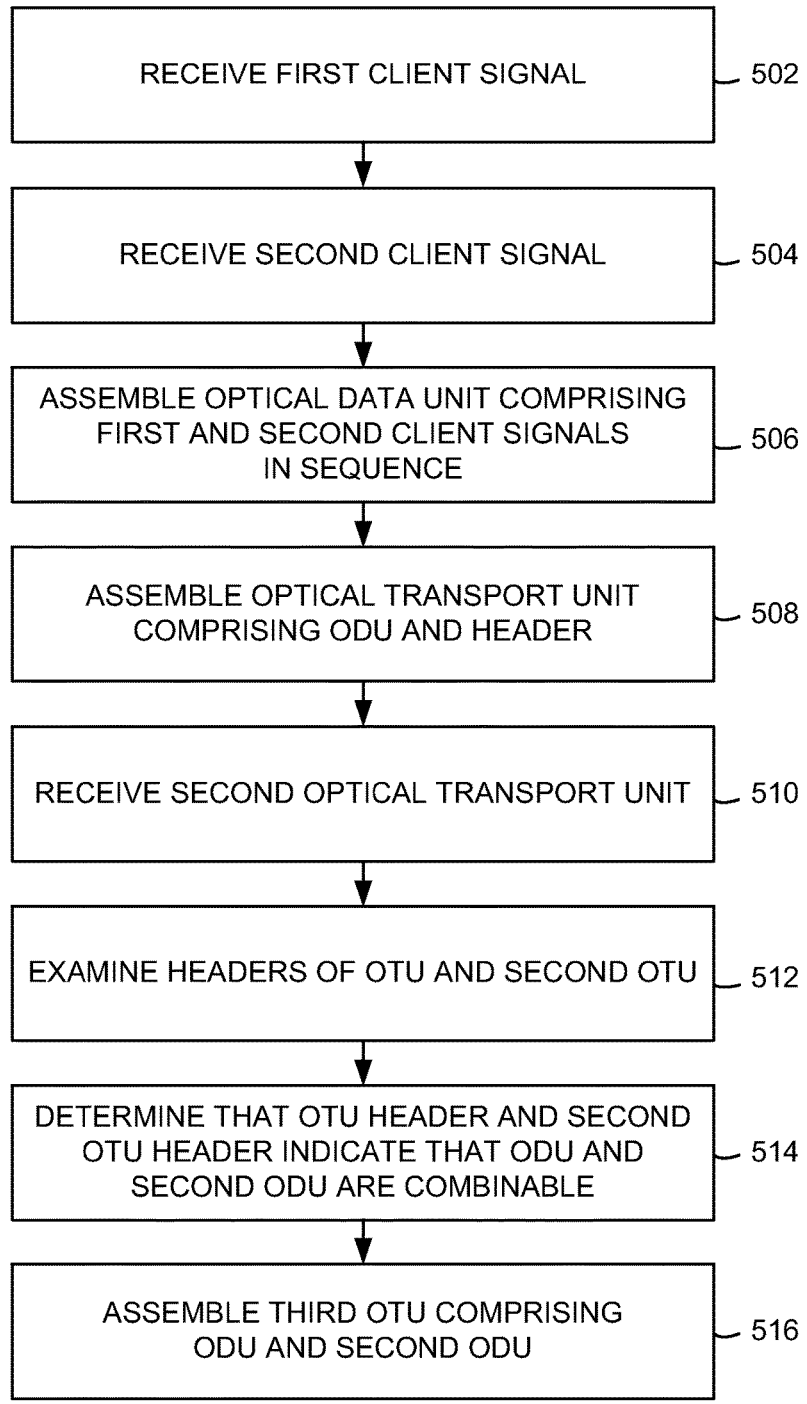
FIG. 5 illustrates another exemplary method of transporting data over an optical transport network.

FIG. 5 illustrates another exemplary method of transporting data over an optical transport network. A first client signal is received at a network element of the optical transport network (operation 502), and subsequently or together with the first client signal, a second client signal is received at the network element of the optical transport network (operation 504). The network element can comprise an OTN gateway node or similar network element, such as OTN gateway node 102. In examples, the first and second client signals are received substantially simultaneously, such as when the communication network comprises a synchronized network. For example, signal 112 (FIG. 1) can represent the first client signal and the second client signal. This is merely exemplary, and a greater number of client signals may arrive as well. The first client signal comprises a first header and a first data payload, and the second client signal comprises a second header and a second data payload. The data portion or data payload portion of a packet remains distinct from a header portion, even where the packet receives additional header information (such as by packet encapsulation or a similar process). In other words, even when a packet is encapsulated, or even when additional header information is added to a data packet, any additional header information does not combine information from the data portion with any header portion.

An optical data unit is assembled, the optical data unit comprising the first client signal and the second client signal in sequence (operation 506). For example, FIG. 3B illustrates an exemplary optical data unit (ODU) assembled in sequence. Then, referring back to FIG. 5, an optical transport unit is assembled comprising the optical data unit and an optical transport unit header, the optical transport unit header comprising an indication of a remaining capacity of the optical transport unit (operation 508). An optical transport unit (OTU) is illustrated in FIG. 3A comprising an ODU and header information (overhead OH). Where client signals are assembled into an optical data unit using, for example, time multiplexing in one ODU frame rather than more complex multi-frame byte-interleaving, optical data unit headers can comprise an indication an amount of data in a payload. Further, each optical transport unit (OTU) header can comprise an indication of an amount of information in an OTU payload.

Figure 6:
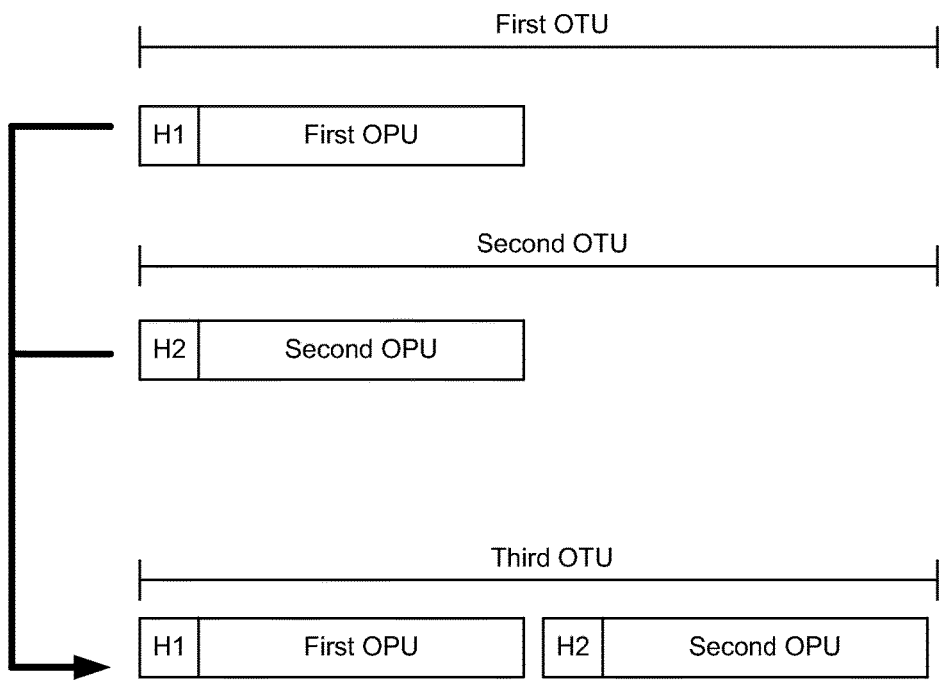
FIG. 6 illustrates an exemplary optical transport unit assembly.

Next, in operation 510, a second OTU is received at the network element. The second OTU can comprise a second optical data unit and a second optical transport unit header. The second optical data unit can comprise a client signal, and the second optical transport unit header can comprise an indication of a remaining capacity of the second optical transport unit. FIG. 6 illustrates two optical transport units OTU1 and OTU2, each comprising header information (H1 and H2, respectively) and a data payload (ODU1 and ODU2, respectively). An optical network element, such as OTN gateway node 102, can assemble and/or receive optical transport units.

Returning to FIG. 5, the header information of each of the first and second optical transport units is examined (operation 512). Each of the first and second OTU headers H1 and H2 can comprise an indication of a remaining capacity of each optical transport unit. As one example, OTU1 can comprise 50% utilization of its data carriage capacity, and OTU2 can comprise 25% utilization of its data carriage capacity. (These utilization indications are merely exemplary, and other utilization determinations are also possible.) Further, each of OTU headers H1 and H2 (FIG. 6) can comprise an indication that the data payload of each optical transport unit (i.e., ODU1 and ODU2, respectively) is combinable. The indication of combinability can comprise an indication of less than 100% utilization of the optical transport unit, or the indication of combinability can comprise a header bit, header flag, or some other indication of combinability in the header of the optical transport unit.

In operation 514, it is determined that the headers of the first and second optical transport units indicate that their respective payloads are combinable. For example, OTU1 and OTU2 (FIG. 6) can indicate that ODU1 (i.e., the payload of OTU1 without the OTU header) and ODU2 (i.e., the payload of OTU2 without the OTU header) are combinable. Subsequently, a third optical transport unit is assembled at the optical network element comprising the first optical data unit (ODU1) and the second optical data (ODU 2) unit when the indications of the remaining capacity of the first optical transport unit and the second optical transport unit indicate that the first optical data unit and the second optical data unit are combinable into the third optical transport unit (operation 516). Then, the third OTU (OTU3) can be transported across the optical transport network (e.g., OTN 106). Transporting the combined OTU3 rather than the separate, more underutilized OTU1 and OTU2 increased the efficiency of utilization of optical network transport capacity and network elements.

In an embodiment, the rate of transmission of the assembled ODU can be twice the rate of reception of the first and second client signals. That is, the data rate of the first and second client signals can be half of the data rate of the transmitted ODU. Further, the data rate of an outgoing signal can comprise a multiple of an inbound signal. For example, when a data rate of an ODU0 signal is 1.25 Gpbs, a data rate of an ODU1 signal can be 2.5 Gbps (i.e., ODU0×2), a data rate of an ODU2 signal can be 10 Gbps (i.e., ODU1×4), a data rate of an ODU3 signal can be 40 Gbps (i.e., ODU2×4), a data rate of an ODU4 signal can be 100 Gbps (i.e., ODU×2.5), and a data rate of an ODU5 signal can be 400 Gbps (i.e., ODU4×4).

Figure 7:
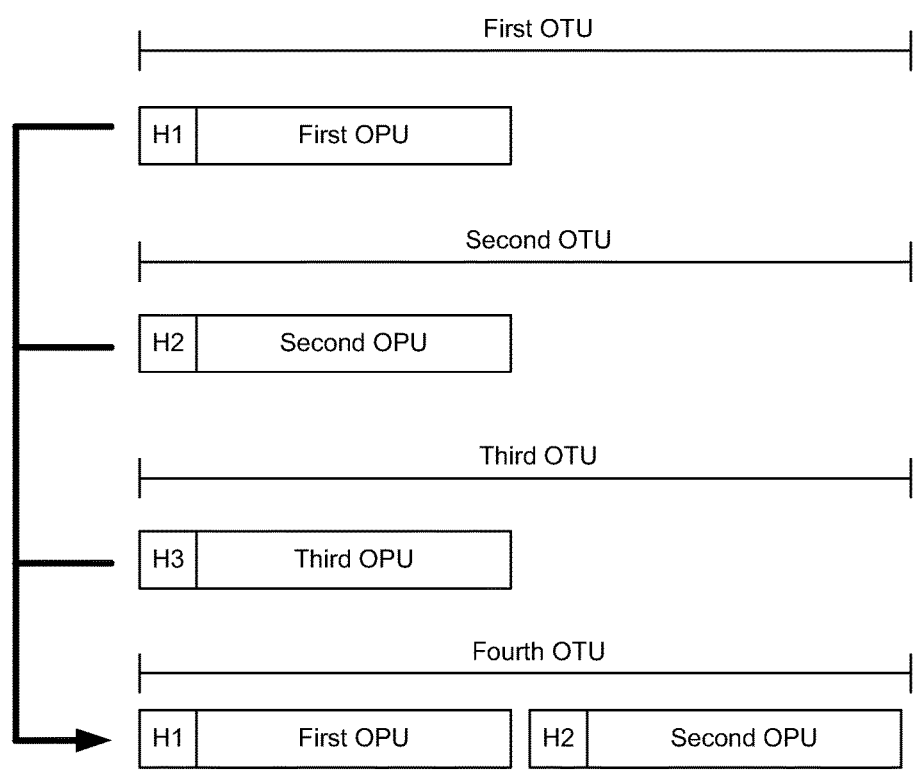
FIG. 7 illustrates an exemplary optical transport unit assembly.

In an embodiment, the header information of each of the first and second optical transport units can indicate whether the optical transport unit is carrying data or is not carrying data. For example, each header can indication of an amount of data in the optical transport unit (for example, in addition to, or as an alternative to, an indication of a remaining capacity of each optical transport unit.) As another example, each header can comprise a bit (e.g., 0 or 1) or another short indication of whether the optical transport unit comprises any data. Referring to FIG. 7, first, second and third OTUs can be received, and their respective headers H1, H2, and H3 can be examined. Header H3 can indicate that the third OPU comprises no data (i.e., the frame is empty). The respective header information can further indicate whether the optical data units are combinable. When a header indicates that the optical transport unit comprises no data (i.e., the OPU, or the frame, is empty) then the optical transport unit can be discarded and not combined into the fourth OTU. In an embodiment, the discarding of received signals can be triggered when more frames are received than are being sent (i.e., more frames are inbound than outbound from OTN 102). While FIGS. 6 and 7 illustrate OTUs and OPUs, it will be appreciated that the method described with respect to FIG. 5 can be used with frames/transport units of any level of the OTN hierarchy (e.g., ODU0, ODU1, ODU2, OPU3, ODU4, ODU5, etc.).

Figure 8:
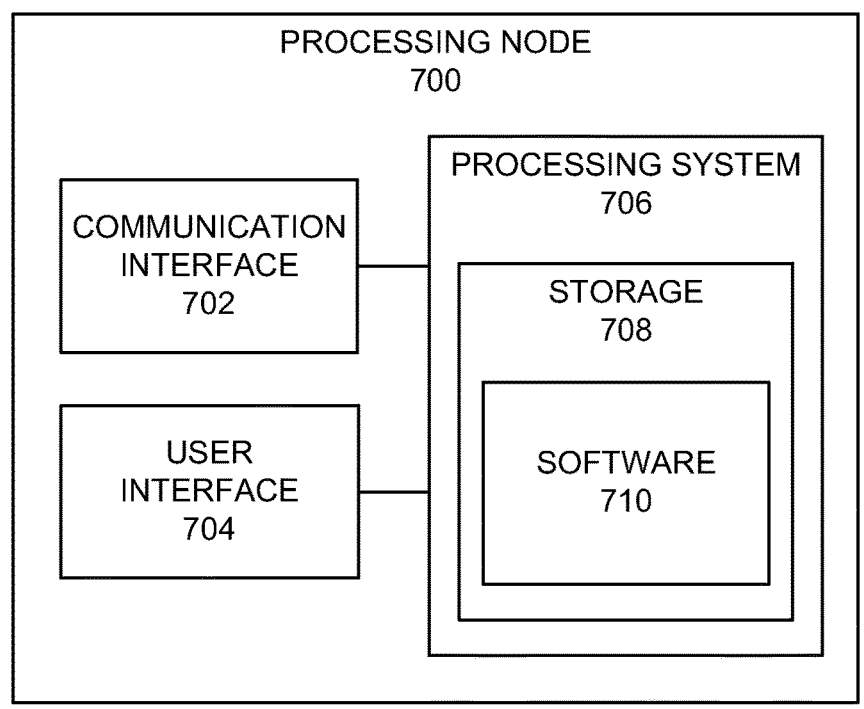
FIG. 8 illustrates an exemplary processing node.

FIG. 8 illustrates an exemplary processing node 700 in a communication system. Processing node 700 comprises communication interface 702, user interface 704, and processing system 706 in communication with communication interface 702 and user interface 704. Processing node 700 can be configured to perform methods of transporting data over an optical transport network. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include OTN gateway nodes 102 and 104. Processing node 700 can also be an adjunct or component of a network element, such as an element of OTN gateway node 102 or OTN gateway node 104. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of transporting data over an optical transport network, comprising:
   receiving at a processor coupled to a network element a first client signal, the first client signal comprising a first header and a first data payload;
   receiving at the processor a second client signal, the second client signal comprising a second header and a second data payload;
   assembling by the processor an optical data unit comprising the first client signal and the second client signal in sequence within a single optical data unit frame interval such that a transmission rate of the optical data unit is proportional to a rate of reception of the first and second client signals, wherein the single optical data unit frame interval comprises a standard size regardless of the transmission rate;

assembling an optical transport unit comprising the optical data unit and an optical transport unit header, the optical transport unit header comprising an indication of a remaining capacity of the optical transport unit;

receiving a second optical transport unit comprising a second optical data unit and a second optical transport unit header, wherein the second optical data unit comprises a third client signal, and wherein the second optical transport unit header comprises an indication of a remaining capacity of the second optical transport unit;

assembling a third optical transport unit comprising the optical data unit and the second optical data unit when indications of the remaining capacity of the optical transport unit and the second optical transport unit indicate that the optical data unit and the second optical data unit are combinable into the third optical transport unit; and transmitting by the processor the third optical transport unit over the optical transport network without interleaving the first, second, and third client signals.

2. The method of claim 1, wherein the first data payload and the second data payload are not interleaved.

3. The method of claim 1, wherein the first header and the second header are not interleaved.

4. The method of claim 1, wherein the optical data unit further comprises the first client signal and the second client signal in a time sequence.

5. The method of claim 1, further comprising assembling the optical data unit comprising the first client signal and the second client signal using time division multiplexing.

6. The method of claim 1, further comprising:
receiving a fourth client signal, the fourth client signal comprising a third header and a third payload, wherein the third payload comprises an amount of data below a threshold; and
assembling the optical data unit comprising the first client signal and the second client signal in sequence when the third payload comprises an amount of data below the threshold.

7. The method of claim 6, further comprising:
determining that the third header comprises an indication that the third payload comprises the amount of data below the threshold; and
assembling the optical data unit comprising the first client signal and the second client signal in sequence without the fourth client signal according to the third header indication.

8. A system of transporting data over an optical transport network, comprising:
a processing node; and a processor coupled to the processing node, the processor for configuring the processing node to:
receive a first client signal, the first client signal comprising a first header and a first data payload;
receive a second client signal, the second client signal comprising a second header and a second data payload;
assemble an optical data unit comprising the first client signal and the second client signal in sequence within a single optical data unit frame interval such that a transmission rate of the optical data unit is proportional to a rate of reception of the first and second client signals, wherein the single optical data unit frame interval comprises a standard size regardless of the transmission rate;

assemble an optical transport unit comprising the optical data unit and an optical transport unit header, the optical transport unit header comprising an indication of a remaining capacity of the optical transport unit;

receive a second optical transport unit comprising a second optical data unit and a second optical transport unit header, wherein the second optical data unit comprises a third client signal, and wherein the second optical transport unit header comprises an indication of a remaining capacity of the second optical transport unit;

assemble a third optical transport unit comprising the optical data unit and the second optical data unit when indications of the remaining capacity of the optical transport unit and the second optical transport unit indicate that the optical data unit and the second optical data unit are combinable into the third optical transport unit; and transmit the third optical transport unit over the optical transport network without interleaving the first, second, and third client signals.

9. The system of claim 8, wherein the first data payload and the second data payload are not interleaved.

10. The system of claim 8, wherein the first header and the second header are not interleaved.

11. The system of claim 8, wherein the optical data unit further comprises the first client signal and the second client signal in a time sequence.

12. The system of claim 8, wherein the processing node is further configured to assemble the optical data unit comprising the first client signal and the second client signal using time division multiplexing.

13. The system of claim 8, wherein the processing node is further configured to:
receive a fourth client signal, the fourth client signal comprising a third header and a third payload, wherein the third payload comprises an amount of data below a threshold; and
assemble the optical data unit comprising the first client signal and the second client signal in sequence without the fourth client signal according to the third header indication.

14. The system of claim 13, wherein the processing node is further configured to:
determine that the third header comprises an indication that the third payload comprises the amount of data below the threshold; and
assemble the optical data unit comprising the first client signal and the second client signal in sequence without the fourth client signal according to the third header indication.

* * * * *